United States Patent
Riley et al.

(10) Patent No.: US 11,226,908 B2
(45) Date of Patent: Jan. 18, 2022

(54) SECURING TRANSACTIONS INVOLVING PROTECTED MEMORY REGIONS HAVING DIFFERENT PERMISSION LEVELS

(71) Applicant: HEWLETT PACKARD ENTERPRISE DEVELOPMENT LP, Houston, TX (US)

(72) Inventors: Dwight D. Riley, Houston, TX (US); Shiva R. Dasari, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 40 days.

(21) Appl. No.: 16/528,559

(22) Filed: Jul. 31, 2019

(65) Prior Publication Data

US 2021/0034547 A1 Feb. 4, 2021

(51) Int. Cl.
*G06F 12/14* (2006.01)
*G06F 3/06* (2006.01)
*G06F 12/1081* (2016.01)

(52) U.S. Cl.
CPC ........ *G06F 12/1441* (2013.01); *G06F 3/0622* (2013.01); *G06F 3/0637* (2013.01); *G06F 3/0673* (2013.01); *G06F 12/1081* (2013.01); *G06F 12/1483* (2013.01)

(58) Field of Classification Search
CPC ............. G06F 12/1441; G06F 12/1483; G06F 3/0673; G06F 3/0622; G06F 3/0637; G06F 12/1081; G06F 3/0649; G06F 3/0679; G06F 3/068; G06F 12/145; G06F 2212/657; G06F 2212/1052

USPC .................................. 711/163; 710/36, 200
See application file for complete search history.

(56) References Cited

U.S. PATENT DOCUMENTS

| | | | | |
|---|---|---|---|---|
| 2012/0079102 A1* | 3/2012 | Damodaran | ........ | G06F 11/1064 709/224 |
| 2017/0286326 A1* | 10/2017 | Guim | ...................... | G06F 21/79 |
| 2017/0293574 A1* | 10/2017 | Berke | ................. | G06F 12/0868 |
| 2019/0102321 A1* | 4/2019 | Trikalinou | ............ | G06F 12/145 |
| 2019/0227827 A1* | 7/2019 | Zmudzinski | .......... | G06F 9/5016 |
| 2019/0243757 A1* | 8/2019 | Liang | ...................... | G06F 13/20 |
| 2020/0278935 A1* | 9/2020 | Borikar | ............... | G06F 12/1081 |

* cited by examiner

*Primary Examiner* — Hong C Kim (74) *Attorney, Agent, or Firm* — Hewlett Packard Enterprise Patent Department (57) ABSTRACT

In exemplary aspects described herein, system memory is secured using protected memory regions. Portions of a system memory are assigned to endpoint devices, such as peripheral component interconnect express (PCIe) compliant devices. The portions of the system memory can include protected memory regions. The protected memory regions of the system memory assigned to each of the endpoint devices are configured to control access thereto using device identifiers and/or process identifiers, such as a process address space ID (PASID). When a transaction request is received by a device, the memory included in that request is used to determine whether it corresponds to a protected memory region. If so, the transaction request is executed if the identifiers in the request match the identifiers for which access is allowed to that protected memory region.

12 Claims, 8 Drawing Sheets

SECURING TRANSACTIONS INVOLVING PROTECTED MEMORY REGIONS HAVING DIFFERENT PERMISSION LEVELS

BACKGROUND

Today's computing systems are increasingly equipped with numerous subsystems that provide additional computational capabilities and can offload tasks from the system's main central processing unit (CPU). These subsystems are commonly equipped with their own CPUs and other powerful resources. The subsystems are provided with direct access to the system memory, and often such access is unbounded and/or under controlled.

BRIEF DESCRIPTION OF THE DRAWINGS

Certain examples are described in the following detailed description and in reference to the drawings, in which.

DETAILED DESCRIPTION

Computing systems and subsystems are increasingly becoming increasingly complex and gaining more capabilities. For instance, traditional single system server architectures (e.g., x86) are becoming obsolete. These single system server architectures are being replaced by systems that include multiple intelligent subsystems (i.e., devices) that support and offload tasks from the main CPU. These subsystems include a variety of controllers, equipped with their own, powerful resources (e.g., CPUs, memory, interfaces, etc.), examples of which include SmartNIC, SmartIO and storage controllers. Often, these subsystems have the same computational capacities as the server's main CPU. Accordingly, today's system architectures are more akin to a cluster of systems (and subsystems) working together and moving data directly into each other's memory spaces. Often, access to each system's memories lack adequate and fine grain controls and/or oversight. By virtue of such unrestricted or under-restricted access to system memory, the system is left vulnerable to security threats. Accordingly, there is a need for systems and methods for securing system memory by, among other things, providing protected or restricted memory regions and enabling access to those regions based on certain criteria. By relying on criteria such as device identifiers and process (or thread) identifiers, access to system memory can be more finely controlled and managed.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

Figure 1:
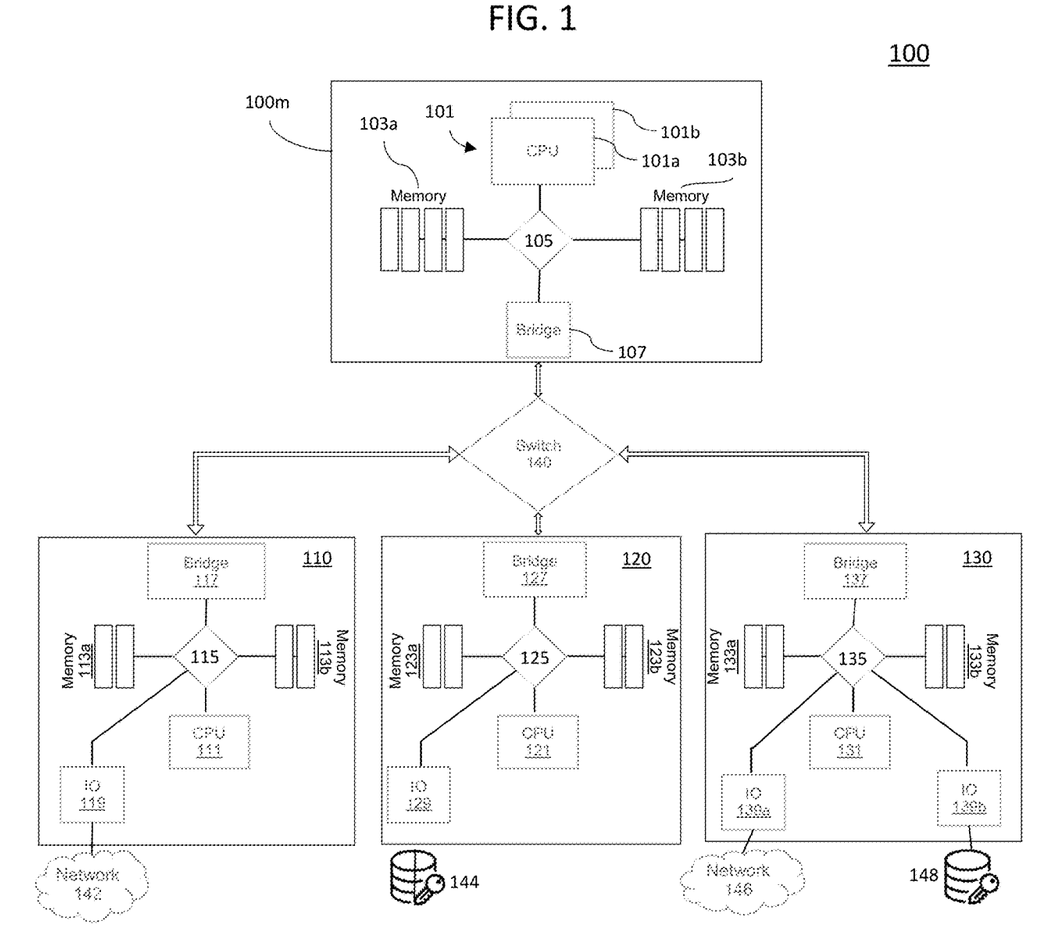
FIG. 1 is a diagram illustrating an exemplary computing system for, among other things, securing system memory.

FIG. 1 is a diagram illustrating an exemplary computing system 100 for, among other things, securing system memory. As described herein, in some embodiments, the system 100 can be and/or include a main central processing unit 101 (CPU) that is communicatively coupled to endpoint devices 110 (device 1), 120 (device 2) and 130 (device 3). Each of the endpoint devices 110, 120 and 130 include respective CPUs 111, 121, and 131. As known to those of skill in the art, a CPU refers, in some embodiments, to electronic circuitry that can execute compute readable instructions. It should be understood that the main CPU and/or the CPUs of the endpoint devices can be or include any number of CPUs. In some embodiments, a CPU can include or refer to one or more processors or processing cores. For instance, in exemplary FIG. 1, the CPU 101 can include CPU cores 101a and/or 101b. Processors refer to electronic circuits that can perform, for example, data processing and/or control operations.

The CPUs 101, 111, 121 and 131 are interconnected and/or communicatively coupled to memories 103, 113, 123 and 133, respectively. Each of the memories 103, 113, 123 and 133 can refer to or include multiple memory devices or components. As illustrated in exemplary FIG. 1, the memory 103 is made up of memory devices 103a and 103b; memory 113 is made up of memory devices 113a and 113b; memory 123 is made up of memory devices 123a and 123b; and memory 133 is made up of memory devices 133a and 133b. Each memory can include or refer to any number of memory devices, which can be volatile (e.g., Random Access Memory (RAM), Static RAM (RAM) (SRAM), Dynamic RAM (DRAM)) and/or non-volatile (e.g., Non-Volatile RAM (NVRAM), Double Data Rate 4 Synchronous Dynamic (RAM) DDR4 SDRAM) memory devices. Other types of memory devices that may be used include read-only memory (ROM) (e.g., mask ROM, programmable ROM (PROM), erasable programmable ROM (EPROM), and electrically erasable programmable ROM (EEPROM)), flash memory, memristor devices, and the like.

The CPUs 101, 111, 121 and 131 are communicatively coupled to their memories 103, 113, 123 and 133 via respective interconnects 105, 115, 125 and 135. In some embodiments, the interconnects can refer to components being integrated, embedded and/or provided onboard a base structure such as a mainboard, system board, mother board, logic board, and the like. For instance, a CPU and corresponding memories (e.g., CPU 101 and memory 103) can be provided on the same structure. The interconnects can refer to slot or other interfaces of a base structure. In some embodiments, the interconnects can refer to and/or include one or more channels and/or communication networks or buses known to those of skill in the art, such as a Peripheral Component Interconnect (PCI) bus, an Industry Standard Architecture (ISA) bus, a PCI Express (PCIe) bus, and high performance links, such as the Intel® direct media interface (DMI) system, QuickPath Interconnects, Hyper-Transport, Double Data Rate (DDR), SATA, SCSI, or Fibre Channel Bus, and the like.

It should be understood that the interconnects 105, 115, 125 and 135 can be used to communicatively couple any number and types of devices, such as controllers storage devices, networks mouse, keyboard, display, and the like. In some embodiments, the devices 110, 120 and 130 are communicatively coupled and/or interconnected to networks and/or storage devices via input/output (I/O or IO) controllers, interfaces, and the like. For example, the device 110 is communicatively coupled to a network 142 via 10 controller 119; the device 120 is communicatively coupled to a storage device 144 via 10 controller 129; and the device 130 is communicatively coupled to a network 146 and a storage device 148 via 10 controllers 139a and 139b. It should be understood that the devices 110, 120 and 130 can be communicatively coupled to the same networks and/or storage devices as one another. Moreover, the networks 142 and 146 can be or include any number and types of networks, including local area networks (LANs), cluster area networks, storage area networks, the Internet, and others known to those of skill in the art.

Still with reference to FIG. 1, the main CPU 101 and the endpoint devices 110, 120 and 130 include and/or are communicatively coupled to bridges 107, 117, 127 and 137, or other similar networking units or devices capable of interconnecting computing systems, devices, components and the like. In some embodiments, the bridges refer to digital logic that handles the interconnections. For instance, the bridges 107, 117, 127 and 137, communicatively couple the respective CPU or endpoint devices to one another via a switch 140 that provides point-to-point serial connections. As known to those of skill in the art, each of the devices has a dedicated connection with the switch 140. It should be understood that the switch 140 can refer to and/or include any number of switches. In some embodiments, the bridges 107, 117, 127 and 137, and the switch 140 are PCIe compliant bridges or switches. Moreover, in some embodiments, the switch 140 is configured to process 64-bit memory addresses, as described in further detail herein. The bridges and switches enable the CPU 101 and CPUs 111, 121 and 131 of the computing devices 110, 120 and 130 to communicate with one another and, among other things, process requests such as reads and writes of other memories.

As described in further detail below, the system 100 can be any type of computing system, apparatus, device or the like that includes computing hardware. For instance, in some embodiments, the system 100 can be a server or the like. The system 100 (e.g., server) can include a main system that can be referred to as the host or host device, and which includes the CPU 101 (host CPU), memory 103 (host memory) and interconnect 105. Moreover, the endpoint devices 110, 120 and 130 can be referred to as subsystems relative to the host device. In some embodiments, the subsystems can refer to any device or component having processing capabilities. For instance, in some embodiments described herein, the subsystems of the system 100 can be any type of controller, such as an I/O controller, graphics controller, enterprise controller, disk array controller, storage controller, network controllers and the like. Illustrative and non-limiting examples include a SmartNIC or SmartIO controller. In some embodiments, the controllers include, among other things, respective CPUs and memory, and are configured to enhance the performance of the overall system and/or the host CPU. That is, storage and network controllers can accelerate system processing by offloading tasks from the host CPU such as security (e.g., encryption), networking (e.g., virtualization) and storage tasks.

Figure 2:
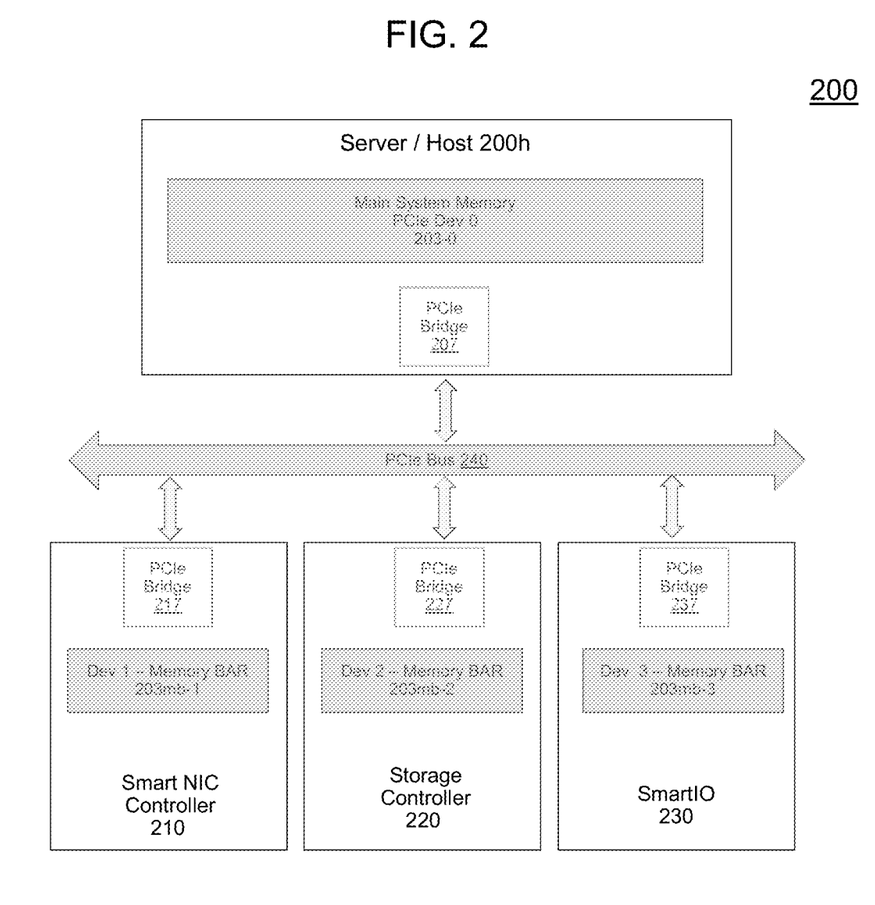
FIG. 2 is a diagram illustrating an exemplary embodiment of a system for securing memory accesses.

Example embodiments for securing memory will now be described with reference to FIGS. 2 to 6. FIG. 2 illustrates an exemplary system 200 for securing memory accesses. In some embodiments, the system 200 is a server or the like having one or more boards or base structures for interconnecting various components and/or devices.

As shown in FIG. 2, the system 200 includes four PCIe devices 0 to 3, namely Dev 0 (200h), Dev 1 (210), Dev 2 (220) and Dev 3 (230), though of course the system 200 can include any number and type of devices. The devices 200h, 210, 220 and 230 can be of any type, such as an application specific integrated circuit (ASIC). In one example embodiment, the device 210 is a SmartNIC controller, the device 220 is a storage controller, and the device 230 is a SmartIO controller (e.g., NIC and storage controller). Although not illustrated in FIG. 2, each of the devices 200h, 210, 220 and 230 include corresponding CPUs and memory, as shown in exemplary FIG. 1. It should be understood that the devices can also include other physical and logical components not illustrated in FIG. 2, as known to those of skill in the art. In some embodiments, Dev 0 (200h) is referred to as the host or host device, and Devs 1 to 3 (210, 220, 230) are referred to as endpoints (or PCIe endpoints).

Moreover, each of the devices 200h, 210, 220 and 230 includes and/or is communicatively coupled to PCIe bridges 207, 217, 227 and 237, respectively. It should be understood that the PCIe bridges can be physical or logically connected to their respective devices. For instance, in some embodiments, the PCIe bridges can refer to logic of or on their corresponding CPUs, such as the CPU (not illustrated in FIG. 2) of the device 200h including the bridge 207. In some embodiments, the bridges 207, 217, 227 and 237 can provide address translations of packets directed to other devices and/or to its own functions. The PCIe bridges 207, 217, 227 and 237 are connected to the PCIe bus 240, through which transactions (e.g., read, write) can be communicated among the devices. It should be understood that the PCIe bus 240 refers to a logical representation of the connectivity among devices. Moreover, as used herein, the PCIe bus 240 can refer to a switch or switched fabric routing topology (e.g., PCIe) or multi-drop bus design (e.g., PCI-X). In some embodiments, each device can have its own dedicated, point-to-point connection to the switch 240, such that data sent to and from each device does not need to be transmitted through shared connections.

Figure 3:
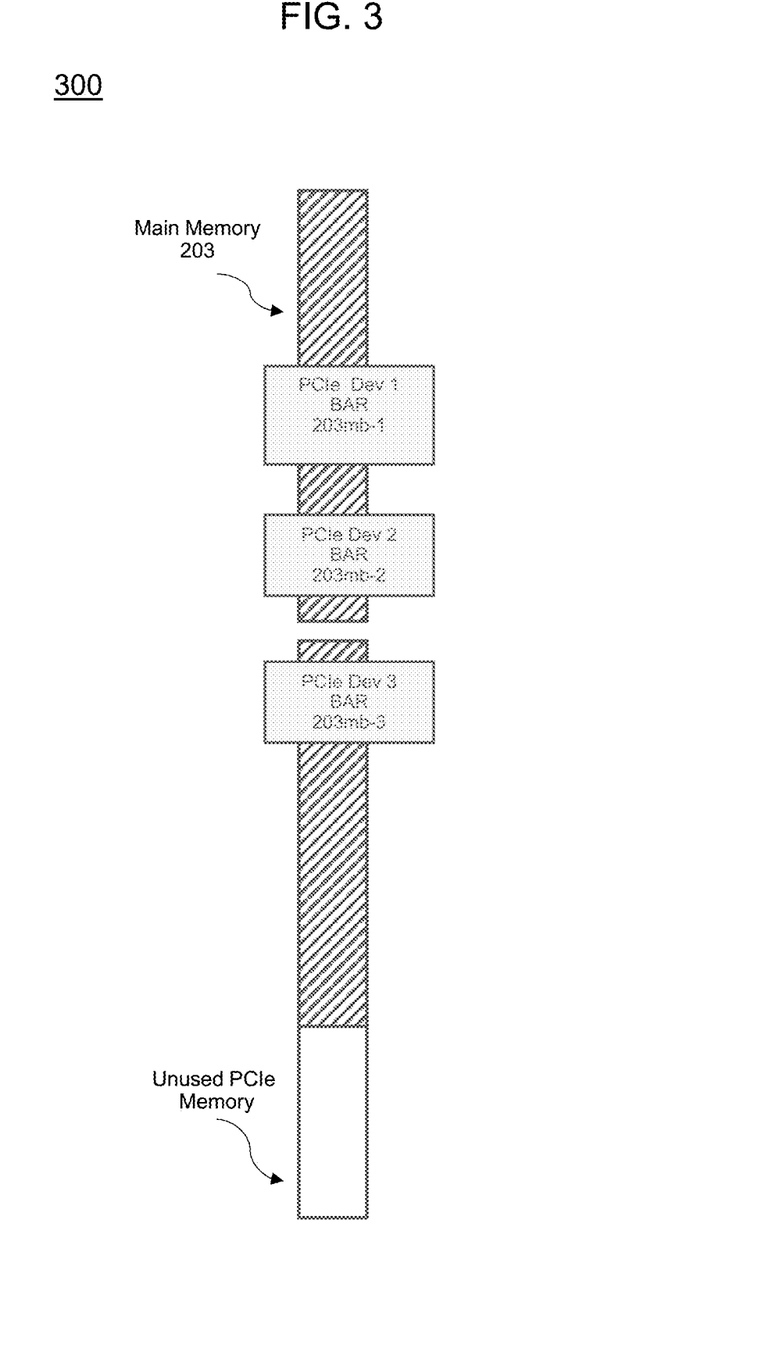
FIG. 3. Is a diagram illustrating a main system memory of the host device of FIG. 2, according to an exemplary embodiment.

As known, during system initialization (e.g., boot process), among other things, the system memory of the host device Dev 0 (200h) is initialized. FIG. 3. Is a diagram illustrating a main system memory 203 of the host device 200h of FIG. 2, according to an exemplary embodiment. Still during the boot process, endpoint devices are discovered and initialized by the main CPU (e.g., during execution of firmware or the like). That is, for example, the PCIe endpoint devices 210, 220 and 230 are detected and memory from the main system memory 203 is assigned to each of the PCIe endpoint devices, as needed (e.g., from a 64-bit address space). More specifically, the host device CPU (e.g., during firmware execution) assigns memory from the system memory 203 to each of the PCIe endpoint devices according to the memory of each device. The mapping of memory addresses of the main system memory 203 that are mapped to each of the PCIe devices are referred to as base address registers (BARs). The values of the BARs of each of the PCIe devices are initialized and/or stored by the PCIe devices themselves and/or by their corresponding bridges (e.g., 217, 227, 237). In some embodiments, the BAR values are stored in a configuration register of each PCIe device.

FIGS. 2 and 3 illustrate the assignment of portions of the system memory 203 to the devices 210, 220 and 230. That is, as shown, Dev 1 includes and/or is associated with a memory bar 203mb-1, Dev 2 includes and/or is associated with a memory bar 203mb-2 and Dev 3 includes and/or is associated with a memory bar 203mb-3. Each of the memory bars 203mb-1, 203mb-2 and 203mb-3 are mapped and/or correspond to portions of the system memory 203, as shown in FIG. 3. Memory bars can be defined using base and limit values.

In some embodiments, the portions of the system memory 203 that are not assigned to the memory bars 203mb-1, 203mb-2 and 203mb-3 can be assigned to the CPU of the host device 200h, and/or can be unused. In FIG. 2, the system memory 203-0 represents the portions of the system memory 203 not assigned to other devices. Traditionally, transactions sent to an address corresponding to an address in a memory BAR assigned to a device are routed to that device. Moreover, a memory bar can, in some instances, be access differently by the endpoint device to which it has been assigned. For instance, a request sent to an address corresponding to the memory bar 203mb-1 is routed to the Dev 0, and the Dev 0 can perform operations on the system memory corresponding to the memory bar 203mb-1. As described in more details below, secure access can be provided for the system memory and memory bars therein.

Figure 4A:
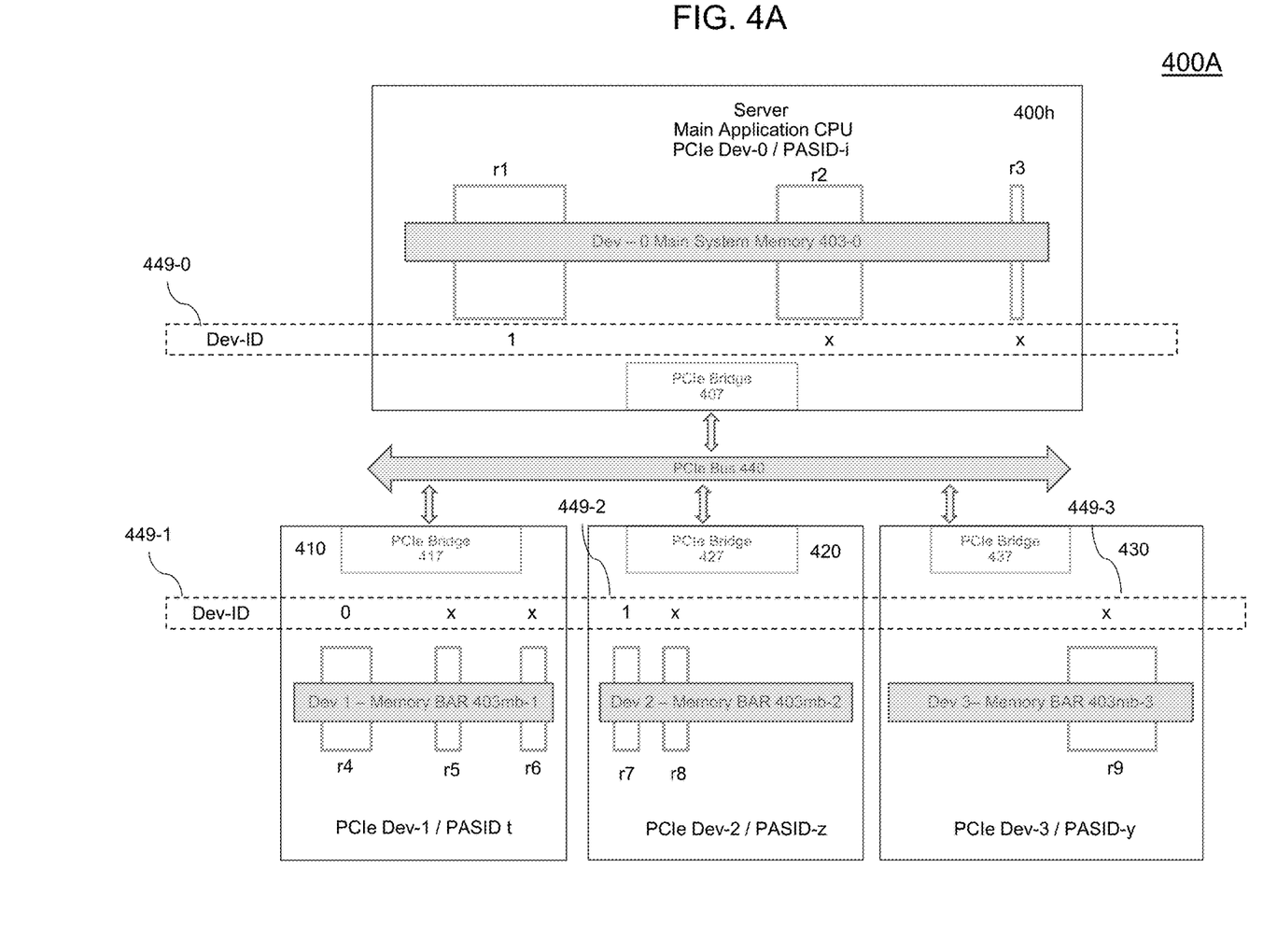
FIG. 4A is a diagram of a system for securing memory using memory fencing regions, according to exemplary embodiments.
Figure 4B:
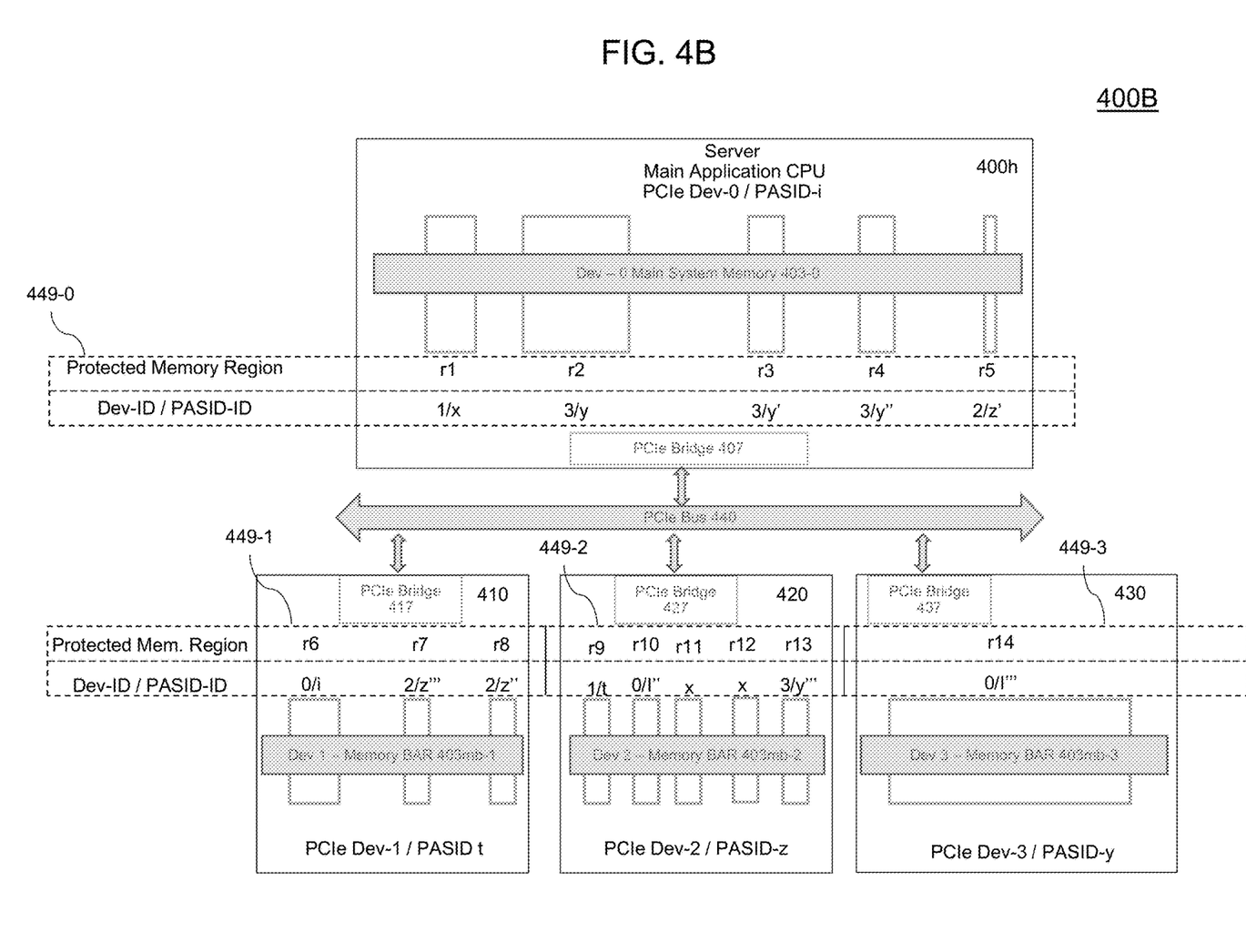
FIG. 4B is a diagram of a system for securing memory using memory access doors, according to exemplary embodiments.

FIGS. 4A and 4B are diagrams of systems 400A and 400B for securing memory according to exemplary embodiments. Specifically, the systems 400A and 400b includes a PCIe host device 400h and PCIe endpoint devices 410, 420 and 430. The host device 400h is assigned a device ID Dev-0, and the endpoint devices 410, 420 and 430 are assigned device IDs Dev-1, Dev-2 and Dev-3, respectively. Although not illustrated, it should be understood that each of the devices 0 to 4 can include various hardware and/or software, such as CPU and memory.

Each of the devices 400h, 410, 420 and 430 can execute instructions corresponding to processes. In some embodiments, each process being executed by the devices can be assigned a unique process identifier such as the PCI Process Address Space ID (PASID). As explained with reference to FIG. 4B, the PASID can be used to secure memory. Nonetheless, FIGS. 4A and 4B illustrate processes being run, at a time instance, by each of the devices. Specifically, Dev-0 is executing a process with a unique identifier PASID-i; Dev-1 is executing a process with a unique identifier PASID-t; Dev-2 is executing a process with a unique identifier PASID-z; and Dev-3 is executing a process with a unique identifier PASID-y.

Still with reference to FIG. 4A, the devices 400h, 410, 420 and 430 can be configured to restrict or block access to portions of their respective blocks of the system memory 203. In some embodiments, these protected memory spaces can be referred to as fences. Protected memory regions can be configured to restrict access to specific devices, or restrict access to any devices that are not within a list of specific devices. Accordingly, in some embodiments, a restricted region can be defined by a memory address range (e.g., base and limit values) and a list of devices (e.g., device IDs) to block (or list of devices not to block). Information defining restricted regions of the memories is stored by each respective device. In some embodiments, the information defining restricted memory regions can be stored as part of the configuration register of each device.

For example, as shown in FIG. 4A, the memory 403-0 of the Dev-0 includes protected memory regions r1, r2 and r3. The Dev-0 stores protected memory region information 449-0, which includes a memory region (e.g., defined by a memory address range) and a list of devices (e.g., defined by device IDs). That is, the protected memory region (e.g., 449-0) includes data indicating permissions for accessing protected memory regions. As illustrated, the protected memory region r1 lists device ID 1 (e.g., Dev-1), which is the only device allowed access to that memory region; region r2 lists device ID x, which can be used as a catch-all identifier for denying access to any devices having device IDs (e.g., Dev-1, Dev-2, and Dev-3); and region r3 which also lists device ID x, denying access to any devices. Likewise, the memory bars 403mb-1, 403-mb-2 and 403mb-3 include protected memory regions. The devices Dev-1, Dev-2 and Dev-3 store corresponding protected memory information 449-1, 449-2 and 449-3, which as discussed above, includes memory region information (e.g., memory address range) and a list of device identifiers, indicating permissions for accessing the protected memory regions.

In some embodiments, protected memory region information can list negative or positive permissions. That is, the protected memory region information can positively recite the devices (or devices and processes, or devices and process threads, etc.) allowed to access a protected memory region, or can recite the devices (or devices and processes, or devices and process threads, etc.) that cannot access the protected memory region in contrast to all others. Moreover, protected memory region information can be dynamic or static. For instance, the protected memory region information for a device can be dynamically determined and set (e.g., by a device driver) during runtime or operation of the device, and/or for a device's process or thread during the execution of that process. For instance, as the system 400A is operating, if the device Dev-1 attempts to access a portion of the memory BAR 403mb-2 of the device Dev-2, the determination of whether the Dev-1 can be part of the protected memory region information such that it can have access to the memory BAR 403mb-2 can be made at that time that access is sought. On the other hand, the protected memory region information and access provided thereby can be statically set at a time instance prior to the access attempt by Dev-1. It should be understood that, while access herein is described with reference to device IDs (and, as described below, process IDs), in some embodiments, access to protected memory regions can be determined and set based on other device (and/or process) characteristics besides ID, such as type.

Figure 5:
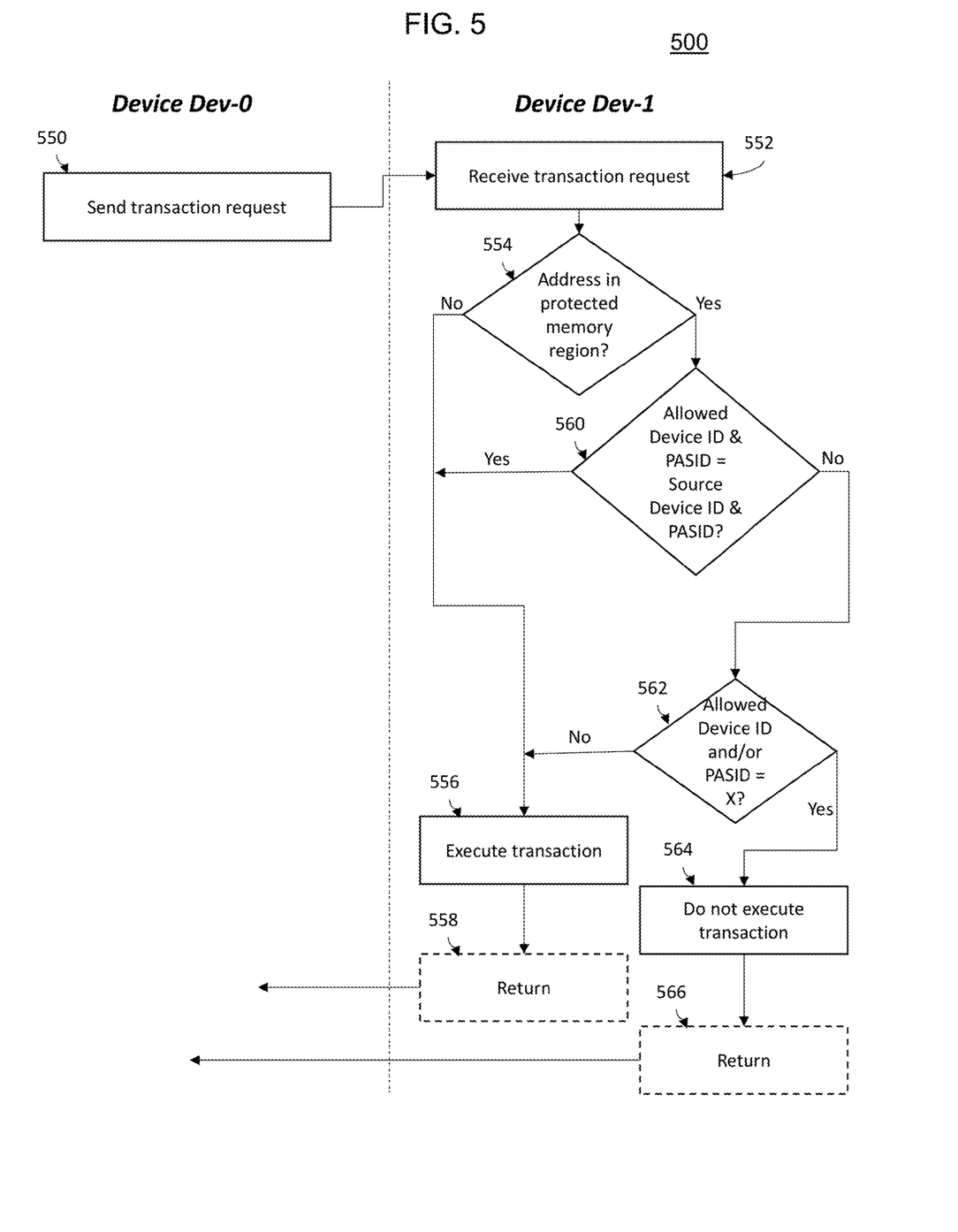
FIG. 5 is an exemplary sequence diagram illustrating the processing of a memory transaction in which memory is secured using protected memory regions.

FIG. 5 is an exemplary sequence diagram 500 illustrating the processing of a memory transaction in which memory is secured using protected memory regions. Specifically, the protected regions, as described above with reference to FIG. 4A, are portions of the system memory to which access is only allowed by certain devices. As illustrated, in FIG. 5, the Dev-0 (400h) generates and transmits a transaction request to the Dev-1 (410), at step 550. In some instances, the request is originated by the CPU of the Dev-1. The transaction request can be, for example, a read or write request. As known to those of skill in the art, the transaction request can include, among other things, the target memory address (or "transaction target address") where or for which the request is to be processed (e.g., the address where data is to be read from or written to); the identifier of the source device (e.g., Dev-0 for device 400h) (or "transaction initiator Dev-ID," "transaction requestor Dev-ID"); and PASID of the corresponding process or thread (or "transaction PASID").

As known to those of skill in the art, in some embodiments, the transaction request is first routed to the bridge 407 of the Dev-0. The bridge 407 analyzes its registers and/or memory mapping information and determines that the transaction originated at step 550 and is not directed to its corresponding memory 403-0. The bridge 407 therefore transmits the transaction request to the PCIe bus 440. It should be understood that the PCIe bus 440 refers to a logical representation of the connectivity among devices. Moreover, as used herein, the PCIe bus 440 can refer to a switch or switched fabric routing topology (e.g., PCIe) or multi-drop bus design (e.g., PCI-X). In some embodiments, each device and/or corresponding bridge can have its own dedicated, point-to-point connection with the switch 440, such that data transmitted to and from each device does not need to be sent through shared connections. Each of the bridges (e.g., 417, 427 or 438) is configured to or capable of analyzing the transaction request and determining whether the transaction target address is within a respective address ranges of their respective BARs 403mb-1, 403mb-2 and 403mb-3. In the example embodiment of FIG. 5, the Dev-0 transmits a transaction request, which includes a target memory address (or "transaction target memory address") that is within the memory BAR 403mb-1. That request is sent to the PCIe switch 440 and, in turn, to the bridge 417 of the Dev-1 which accepts the transaction request since the transaction target address indeed falls within the Dev-1 memory BAR.

Still with reference to FIG. 5, at step 552, the Dev-1 (which is the targeted device and/or PCIe endpoint device) receives or accepts the transaction request at step 552 and begins a process intended to provide enhanced security—e.g., of the memory bar 403mb-1. Specifically, at step 554, the Dev-1 determines whether the transaction target memory address included in the transaction request is within and/or corresponds to a protected memory region, such as the protected memory regions r4, r5 and r6 of the memory bar 403mb-1. That is, the Dev-1 determines whether the transaction (e.g., the transaction initiator or requestor DevID and PASID) is attempting to access (e.g., read from, write to) a fenced or blocked off area of the memory bar 403mb-1.

If the Dev-1 determines at step 554 that the transaction target address included in the transaction request does not correspond to a protected memory region, the Dev-1 (e.g., CPU thereof) executes, at step 556, the transaction requested by the Dev-0. That is, if the transaction target memory address does not correspond to a fenced off area of the memory bar 403mb-1, the read and/or write transactions are accepted and/or executed, at step 556. In some embodiments, if the transaction is a write request, the transaction is accepted, meaning that the data included in the original request is written to the main system memory at the transaction target address. If the transaction is a read request, the transaction is accepted meaning that the data from the transaction target address identified in the request is read from the memory at the transaction target address. In some embodiments, as shown in step 558, if the transaction is a read request, the value resulting from executing the transaction is transmitted to the transaction requestor device (e.g., Dev-0).

Returning to step 554 of FIG. 5, if the transaction target address identified in the request does indeed correspond to a fenced region or protected memory space, the Dev-1 can in turn check the IDs included in the protected memory region information of the relevant protected memory region, at step 560. It should be understood that, as used herein, an ID can refer to one or a combination of a device ID and a PASID. If it is determined by the Dev-1 at step 560 that the allowed device IDs and PASIDs in the protected memory information corresponding to the protected memory region r4 include, match and/or are equal to the transaction device ID and transaction PASID, the Dev-1 executes the transaction at step 556. In some embodiments, the Dev-1 in turn, returns the read data if the transaction request was a read request, at step 558. On the other hand, if the Dev-1 determines at step 560 that the allowed device IDs and PASIDs for the protected memory region do not include or match the transaction device ID and transaction PASID of the requestor device and process, the Dev-1 does not proceed to execute the transaction at step 556 and, instead, proceeds to step 562.

At step 562, the Dev-1 determines whether the allowed device IDs and/or PASIDs for the protected memory region is or are equal to X, which generally indicates that any devices and/or processes are denied access to that protected memory region r4. It should be understood that any variable other than X can be used to indicate that, generally, any devices attempting to access the protected memory region are prohibited from accessing the protected memory region. Thus, for example, at step 560, the Dev-1 checks whether the allowed device IDs and/or PASIDs listed in the protected memory region information 449-1 are equal to X (or the like), such that any access attempt is blocked. If indeed the Dev-1 determines based on the protected memory region information that any device is to be blocked access to that memory region, the Dev-1 rejects the request and/or does not execute the transaction, as shown at step 564. If the transaction that is not executed is a write request, the data included in the request which was to be written is bit bucketed—meaning that it is sent to and/or written to a memory region for lost, deleted or unrecoverable data. On the other hand, if the transaction request that was not executed was a read request, the Dev-1 can return, at step 566, a value indicating an error or invalid request (e.g., FFFF_FFFF). Still with reference to step 562, if the Dev-1 determines that the allowed devices IDs and/or PASIDs for the relevant protected memory region do not include and/or are not equal to the value x (e.g., any device), the Dev-1 can execute the transaction at step 556.

By virtue of the features of FIG. 5, the Dev-1 can restrict access by providing a fenced or fencing range around a protected memory region. For instance, in one embodiment, if the Dev-2 transmits a transaction request with a transaction target address corresponding to the memory bar 403mb-1 of the Dev-1, and the transaction target address corresponds to the protected region r4, the transaction request would not be approved or processed because the protected memory region r4 is only configured to provide access to the Dev-0 (and PASID i). If the target address correspond to the protected region r5, the transaction request would also be prohibited the protected memory region r5 is configured to block access by any transaction device IDs and PASIDs.

In some embodiments, memory regions can be protected or secured by providing access doors or means of entry to those protected regions. As described in further detail below with reference to FIGS. 4B and 6, access to protected regions is explicitly obtained based on the combination of transaction device IDs and process IDs/PASIDs. FIG. 4B is a diagram of a system 400B for securing memory in PCIe transactions. The system 400B is substantially similar to the system 400A. Specifically, the system 400B includes a host device 400h and PCIe devices Dev-1 (410), Dev-2 (420), and Dev-3 (430). Each of the devices includes a corresponding PCIe bridge 407, 417, 427 and 437 that can transmit requests therebetween through the PCIe bus 440. Moreover, each of the devices 410, 420 and 430 includes and/or is assigned a memory BAR that corresponds to a portion of a main memory 403 (not illustrated). Specifically, Dev-1 includes memory bar 403*mb*-1, Dev-2 includes memory bar 403*mb*-2, and Dev-3 includes memory bar 403*mb*-3. The host device 400*h* also includes a portion of the memory, 403-0, which can be the areas of the memory 403 that are not assigned to other devices (e.g., PCIe endpoint devices 410, 420 and 430).

Like the system 400A, the memories of the devices 400*h*, 410, 420 and 430 each include protected memory regions r1-r14. The protected memory regions can be or include means (e.g., access doors) for entering the protected regions. In some embodiments, those means for entering the protected regions can be a transaction device ID and transaction process ID (PASID) that match determined allowed device ID and process ID pairs, as will now be described with reference to FIG. 6.

Figure 6:
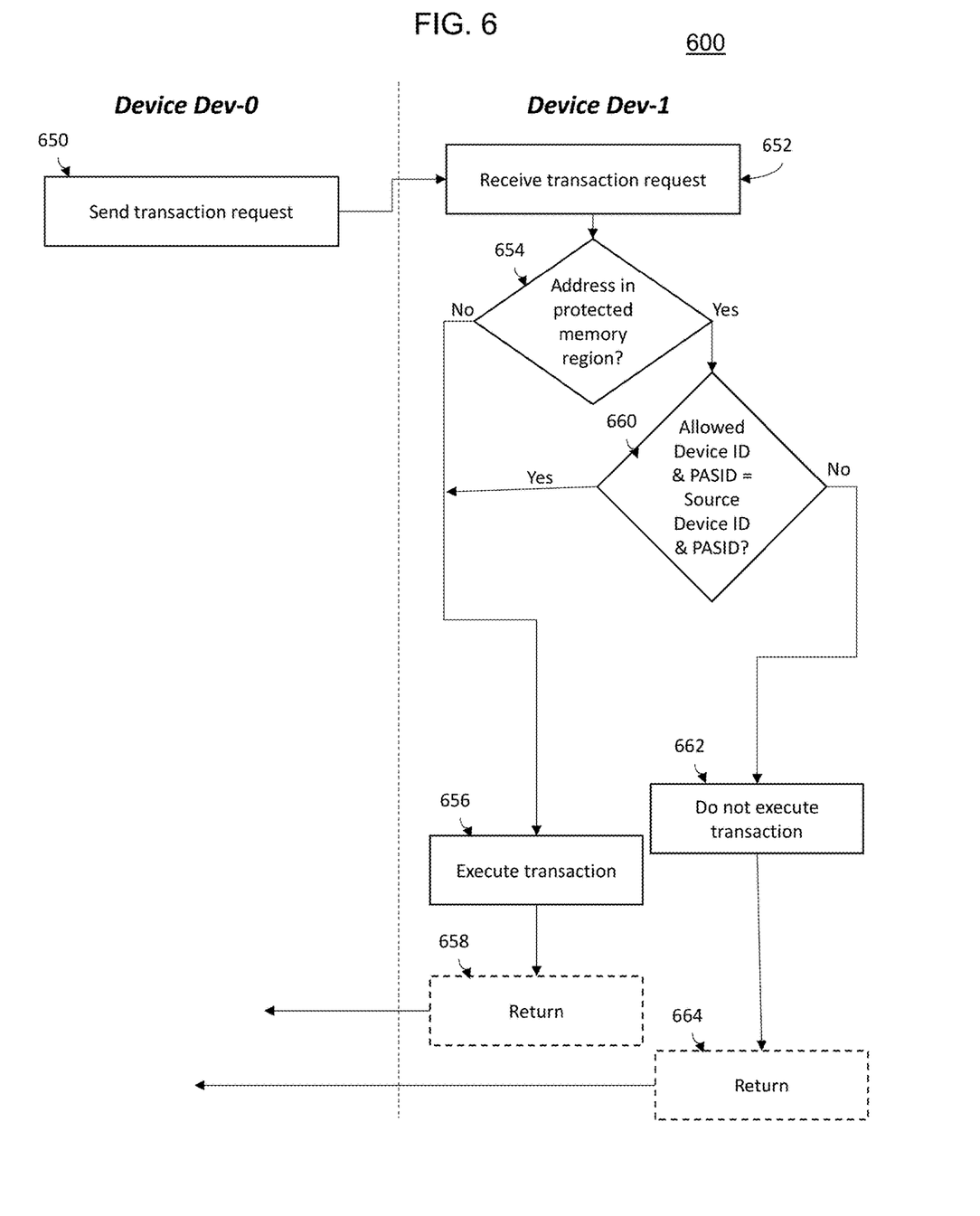
FIG. 6 is an exemplary sequence diagram illustrating the processing of a memory transaction in which memory is secured using protected memory regions.

FIG. 6 is a sequence diagram 600 illustrating the processing of transaction requests for protected memory regions having access doors, according to an exemplary embodiment. Notably, prior to or substantially in parallel with step 650, the Dev-0 executes a process that includes and/or is made up of various threads. The process is assigned a process ID, such as a PASID. As shown in exemplary FIG. 4B, the Dev-0 is executing a process with PASID-i; Dev-2 is executing a process with PASID-t; Dev-3 is executing a process with PASID-x; and Dev-4 is executing a process with PASID-y.

Returning to FIG. 6, the transaction request sent at step 650 includes a transaction target address, transaction device ID of the requestor, initiator and/or source device (e.g., Dev-0), and the transaction PASID of the process with which the transaction request is related and/or was triggered by. The transaction request is routed through the bridges and switch as described above with reference to FIG. 5 and, in turn, received by the Dev-1 at step 652, which includes and/or is associated with the memory bar that the transaction target address corresponds to. The Dev-1 then performs a security check to determine whether the transaction device ID and process ID are permitted to access the target address. That is, at step 654, the Dev-1 checks whether the transaction target address is within a protected memory region. If Dev-1 determines that the target address does not correspond to a protected memory region, the Dev-1 in turn allows and/or approves processing of the transaction (device ID, PASID), at step 656, at the transaction target address. In some embodiments, if the transaction request is a read request, the Dev-1 can return data (e.g., the read data) back to the Dev-0.

On the other hand, if at step 654, the Dev-1 determines that the target address indicated in the transaction request is indeed within a protected memory region, the Dev-1 in turn checks at step 660 whether the list of allowed device IDs and PASIDs include the transaction device ID and transaction PASID included in the transaction request. As shown in FIG. 5, each of the processes can spawn multiple threads. For example, the process with PASID i includes threads that all have a same or similar PASID I, illustrated as i', i'', i''', etc. Thus, at step 660, the Dev-1 checks whether the transaction device ID and transaction PASID included in the transaction request (e.g., Dev-0 and PASID-i) are included in the protected memory region information as being allowed access into the respective protected memory region. If the target address is, for example, within protected memory region r6, the request would be processed, at step 656, since that memory region allows access to transaction processes or threads with transaction PASID-i from the transaction device ID Dev-0. On the other hand, if the transaction target address is the request was within protected memory region r7, the request would not be processed, at step 662, because that region is programmed only to allow access to the transaction device ID Dev-2 and transaction processes with transaction PASID z. In some embodiments, if the transaction that is not executed was a write request, the data included in the request which was to be written is bit bucketed—meaning that it is sent to and/or written to a memory region for lost, deleted or unrecoverable data. On the other hand, if the transaction request was a read request, the Dev-1 can return, at step 664, a value indicating an error or invalid request (e.g., FFFF_FFFF).

Figure 7:
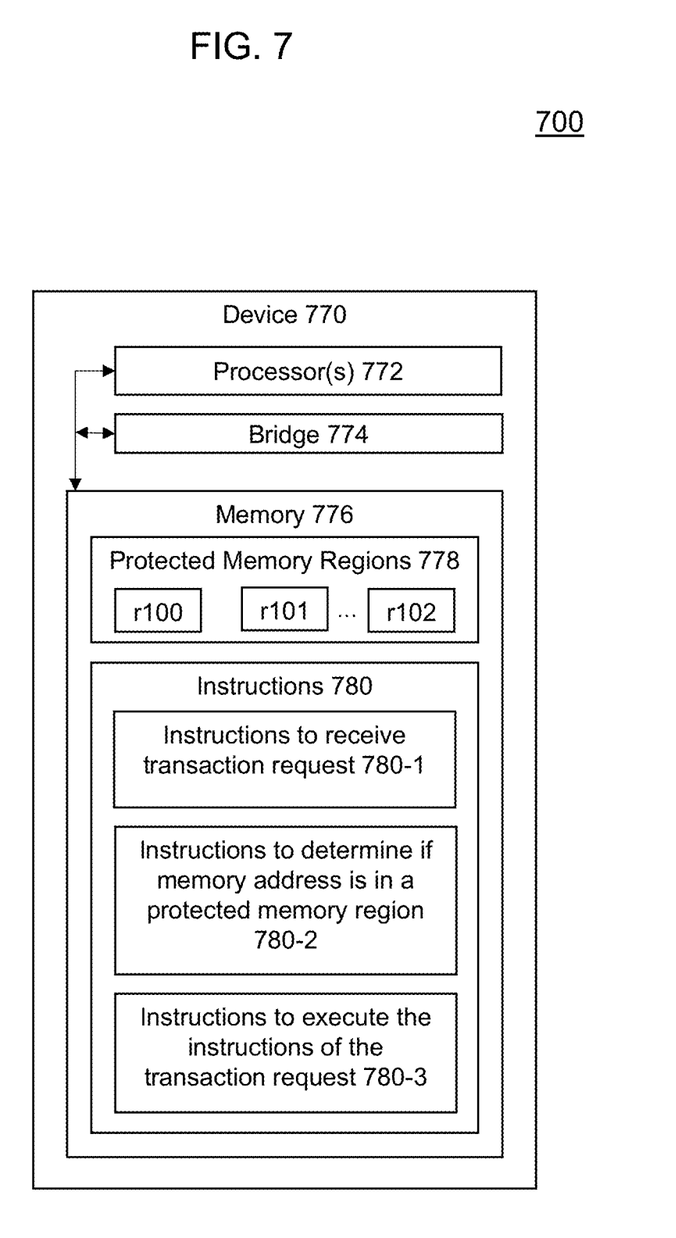
FIG. 7 is a diagram of an exemplary device including protected memory regions.

FIG. 7 illustrates an exemplary device that includes protected memory regions mapped to a system memory, according to exemplary embodiments. As illustrated, the device 770 includes processors 772, a bridge 774 and memory 776, which are communicatively coupled to one another. The memory 776 includes protected memory regions 778, shown as illustrative regions r100, r101 and r102. The protected memory regions correspond to portions of system memory assigned to the device 770. Moreover, in some embodiments, the memory 776 includes and/or is configured to store computer readable and executable instructions 780. In some embodiments, the instructions 780 include: instructions 780-1 to receive a transaction request; instructions 780-2 to determine if a memory address, included in the transaction request, is in a protected memory region such as the illustrated protected memory regions r100, r101 or 002; and instructions 780-3 to execute the instructions of the transaction request.

Various embodiments described herein may be implemented at least in part in any conventional computer programming language. For example, some embodiments may be implemented in a procedural programming language (e.g., "C"), or in an object oriented programming language (e.g., "C++"). Other embodiments may be implemented as a pre-configured, stand-alone hardware element and/or as preprogrammed hardware elements (e.g., application specific integrated circuits, FPGAs, and digital signal processors), or other related components.

In an alternative embodiment, the disclosed systems and methods may be implemented as computer program products for use with computer systems. Such implementations may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the systems and methods.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments may be implemented as a combination of both software (e.g., a computer program product) and hardware. Still other embodiments of the invention are implemented as entirely hardware, or entirely software.

Aspects of the present system and method are described herein with reference to sequence diagrams and/or block diagrams of methods, apparatuses and computer program products according to examples of the principles described herein. Each sequence or block of the diagrams, and combinations of sequences and blocks in the diagrams, may be implemented by computer usable program code. The computer usable program code may be provided to a processor of a general purpose computer, special purpose computer, or other programmable data processing apparatus to produce a machine, such that the computer usable program code, when executed via, for example, a system processor or other programmable data processing apparatus, implement the functions or acts specified in the sequences and/or blocks of the diagrams. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

The invention claimed is:

1. A system comprising:
    at least one processor;
       at least one memory communicatively coupled to the at least one processor, wherein (i) the at least one memory includes at least one protected memory region, and (ii) the at least one memory is configured to store computer executable instructions, which when executed, cause the at least one processor to:
          receive a transaction request including at least a memory address in which to execute an instruction;
          determine whether the memory address corresponds to the at least one protected memory region of the at least one memory; and
          execute the instruction of the transaction request based on the information included in the transaction request; and
    a bridge configured to communicatively couple the system to at least one endpoint device; wherein:
       the transaction request further includes one or more of: (i) the instruction to be executed, (ii) a transaction device ID corresponding to the originator endpoint, from among the at least one endpoint devices, that originated the transaction request, and (iii) a transaction process ID corresponding to the process that triggered the transaction request;
       the at least one memory is further configured to store protected memory region information indicating access permissions for the at least one protected memory region;
       the access permissions are based on one or more of a transaction device ID and a transaction process ID; and
       the at least one protected memory region includes a first protected memory region and a second protected memory region, and wherein the protected memory region information includes permissions for the first protected memory region that are different than permissions for the second protected memory region.

2. The system of claim 1, wherein the permissions indicate when to permit access and/or when to deny access to corresponding protected memory regions.

3. The system of claim 1, wherein the at least one endpoint device is a peripheral component interconnect express (PCIe) type of device and the transaction process ID is a process address space ID (PASID).

4. The system of claim 3, wherein the instruction is executed if the transaction device ID and the transaction PASID match an allowed device ID and allowed PASID indicated in the protected memory region information.

5. The system of claim 1, wherein the access permission are dynamic, such that they are set as access is needed, and/or static, such that they are preset prior to when access is needed.

6. A system comprising:
    one or more devices including a host device and a plurality of PCIe endpoint devices, the one or more devices being communicatively coupled via one or more PCIe bridges and/or PCIe buses, wherein each of the one or more endpoint devices includes at least a processor; and
    a system memory,
    wherein the system is configured to:
       assign portions of the system memory to each of the one or more devices, the parts of the system memory being defined by a range of memory addresses within the system memory;
       set, in each of the portions of the system memory, at least one protected memory region;
       store, by each of the one or more devices, information defining: the assigned portions of the system memory, the corresponding at least one protected memory region, and protected memory region information indicating access permissions for the protected memory region.

7. The system of claim 6, wherein each of the one or more devices is configured to:
    receive a transaction request include at least a target memory address, transaction device ID and transaction process ID that originated the transaction request, the target memory address corresponding to the at least one protected memory region; and
    execute the transaction request if the transaction device ID and transaction process ID are indicated in the protected memory region information as being permitted to access the at least one protected memory region.

8. A method comprising:
    receiving a transaction request including at least a memory address of at least one memory in which to execute an instruction, wherein the at least one memory includes at least one protected memory region;
    determining whether the memory address corresponds to the at least one protected memory region of the at least one memory; and
    executing the instruction of the transaction request based on the information included in the transaction request; wherein:
       the transaction request further includes one or more of: (i) the instruction to be executed, (ii) a transaction device ID corresponding to the originator endpoint, from among the at least one endpoint devices, that originated the transaction request, and (iii) a transaction process ID corresponding to the process that triggered the transaction request;

the access permissions are based on one or more of a transaction device ID and a transaction process ID; and the at least one protected memory region includes a first protected memory region and a second protected memory region, and wherein the protected memory region information includes permissions for the first protected memory region that are different than permissions for the second protected memory region.

9. The method of claim 8, wherein the at least one memory is further configured to store protected memory region information indicating access permissions for the at least one protected memory region.

10. The method of claim 8, wherein the permissions indicate when to permit access and/or when to deny access to corresponding protected memory regions.

11. The method of claim 8, wherein the at least one endpoint device is a peripheral component interconnect express (PCIe) type of device and the transaction process ID is a process address space ID (PASID).

12. The method of claim 11, wherein the access permission are dynamic, such that they are set as access is needed, and/or static, such that they are preset prior to when access is needed, and the instruction is executed if the transaction device ID and the transaction PASID match an allowed device ID and allowed PASID indicated in the protected memory region information.

\* \* \* \* \*